March 29, 1966 P. S. MANSON 3,243,708

VEHICULAR RADIO RECEIVER FOR BOTH AMPLITUDE AND FREQUENCY MODULATION RECEPTION

Filed Oct. 8, 1962 2 Sheets-Sheet 1

PETER S. MANSON
INVENTOR

BY Killman, Smith & Lamb
ATTORNEYS

INVENTOR.
PETER S. MANSON.
BY
Hillman, Smith & Lamb
ATTORNEYS

United States Patent Office 3,243,708
Patented Mar. 29, 1966

3,243,708

VEHICULAR RADIO RECEIVER FOR BOTH AMPLITUDE AND FREQUENCY MODULATION RECEPTION

Peter S. Manson, Glenarm, Md., assignor to The Bendix Corporation, Baltimore, Md., a corporation of Delaware Filed Oct. 8, 1962, Ser. No. 228,967
12 Claims. (Cl. 325—317)

Figure 1:
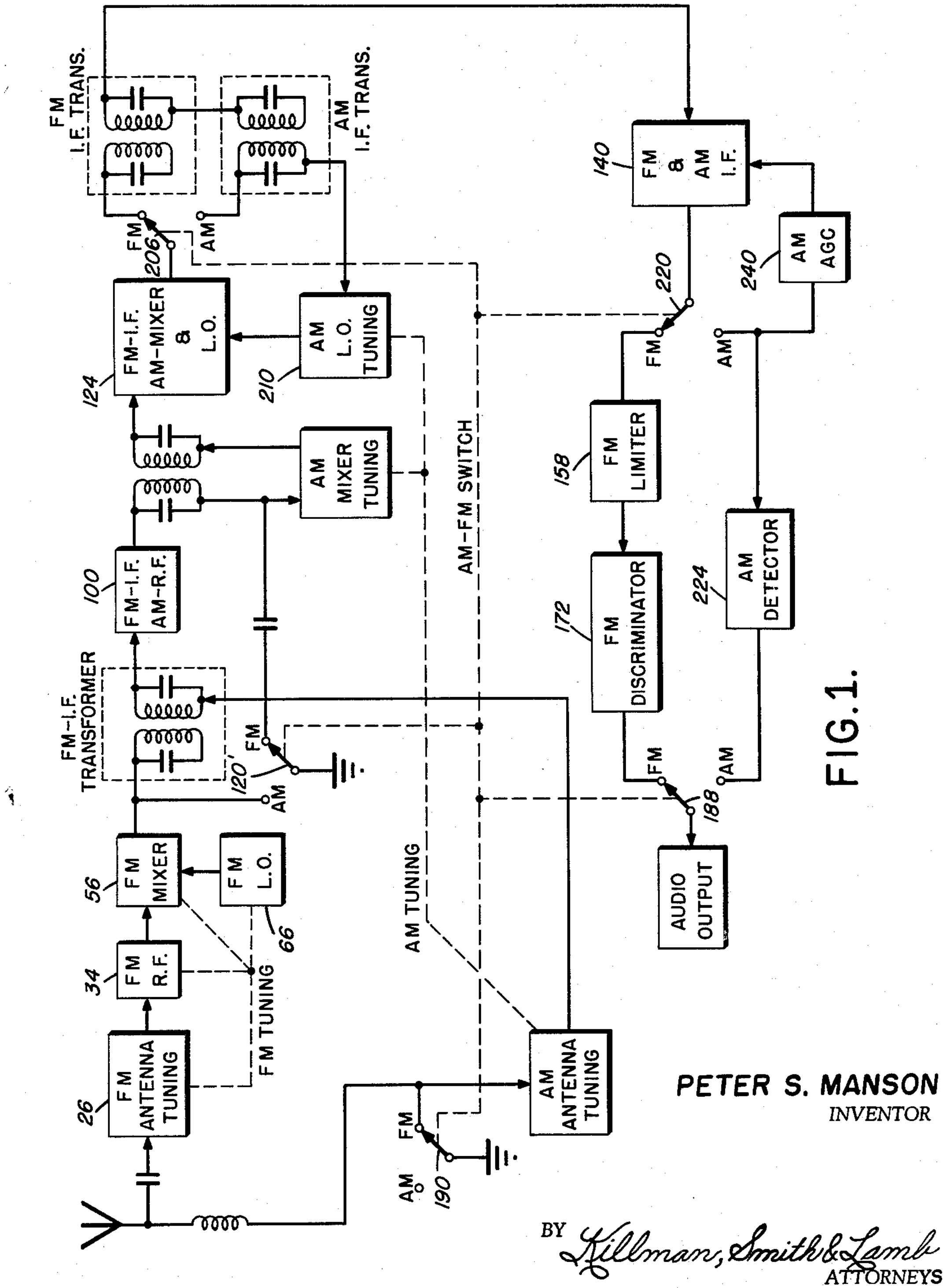

This invention relates to radio receivers and more particularly to a receiver for tuning both amplitude modulation (AM) and frequency modulation (FM) signals suitable for use in vehicles or where the power supply is unusually noisy and variable as to voltage level.

Radio receivers for automotive use are required to meet certain design problems which are rather unique to this application. The direct current power source available is typically subject to fluctuation with engine speed and also carries a substantial component of high frequency noise generated from the ignition system. This noise appears as sharp voltage peaks or "spikes" superimposed on the direct current supply voltage and also as a radiated signal which is received at the antenna. Because of the severity of this problem, special grounding and shielding techniques are required to insure that a reasonably clean signal is received at the speaker. Another problem which is considerably more severe in vehicular receivers than in home receivers, is that of dealing with widely varying signal strength at the antenna. This is normally controlled by using an automatic gain control circuit, but such circuits must be unusually effective in vehicular receivers because of the fact that the vehicle may be rapidly changing position from a strong signal strength area to a very weak area, simply by driving behind a building or a hill. These are problems which are common to all vehicular radios. Automatic gain control circuits, however, introduce an undesirable time constant in FM tuning circuits which either must be compensated for or permitted to exist in spite of a degrading effect.

Where frequency modulation reception of the normal broadband commercial variety (88–108 mc.) is required, additional problems are presented. In the United States, the frequency modulated signals from commercial stations are horizontally polarized as are television signals. For optimum signal utilization, this requires an antenna designed to receive such signals and these antennas normally have their greatest physical dimensions in a horizontal plane. Inasmuch as the usual automobile radio antenna consists of a vertical mast which is quite effective for receiving AM signals, a problem is presented in determining what antenna should be used for FM reception. Because the present state of acceptance of FM broadcasts, for automotive use, is much less than for AM, it is desirable that the standard type of vertical mast be used for both types of reception, even though it is far from optimum for FM reception. This puts a premium on sensitivity of the FM tuner.

Despite the above described special problems, automobile radios, if they are to enter a mass market, must be reasonably priced. With this fact in mind, it has been considered highly desirable that the receiver be produced with as few parts as possible, in addition to those required for a high quality FM receiver. This should be done without degrading appreciably either the AM or the FM performance. Experience has taught that where FM reception is desired, a good automatic frequency control (AFC) system is almost essential. This is particularly true for automobile receivers where, for safety reasons, tuning should be fast and easy.

It is, therefore, an object of the present invention to provide a vehicular radio receiver capable of receiving both amplitude modulation and frequency modulation signals in which gain problems caused by input signals of widely varying voltage level are effectively controlled.

It is another object of the present invention to provide a vehicular AM–FM receiver, in which the sensitivity for tuning FM signals is sufficiently great that good performance can be achieved with a standard automobile radio antenna of the vertical mast type.

It is another object of the present invention to provide a vehicular AM–FM receiver meeting the above objectives in which the FM tuner incorporates a novel and effective automatic frequency control circuit.

It is another object of the present invention to provide a vehicular AM–FM receiver in which the active elements required for the FM tuner are entirely sufficient for the AM tuner, so that no additional active elements are required for the entire receiver than would be required for an FM receiver of the same characteristics.

It is another object of the present invention to provide a high quality vehicular AM–FM receiver which is relatively conventional so far as the number of stages for each of the AM and FM tuners is concerned, but in which the switching from one mode of operation to the other is accomplished with no significant degradation in performance during either AM or FM operation.

It is a further object of the present invention to provide a vehicular AM–FM receiver which accomplishes the above objects and which can be produced to sell at a reasonable price.

Figure 2:
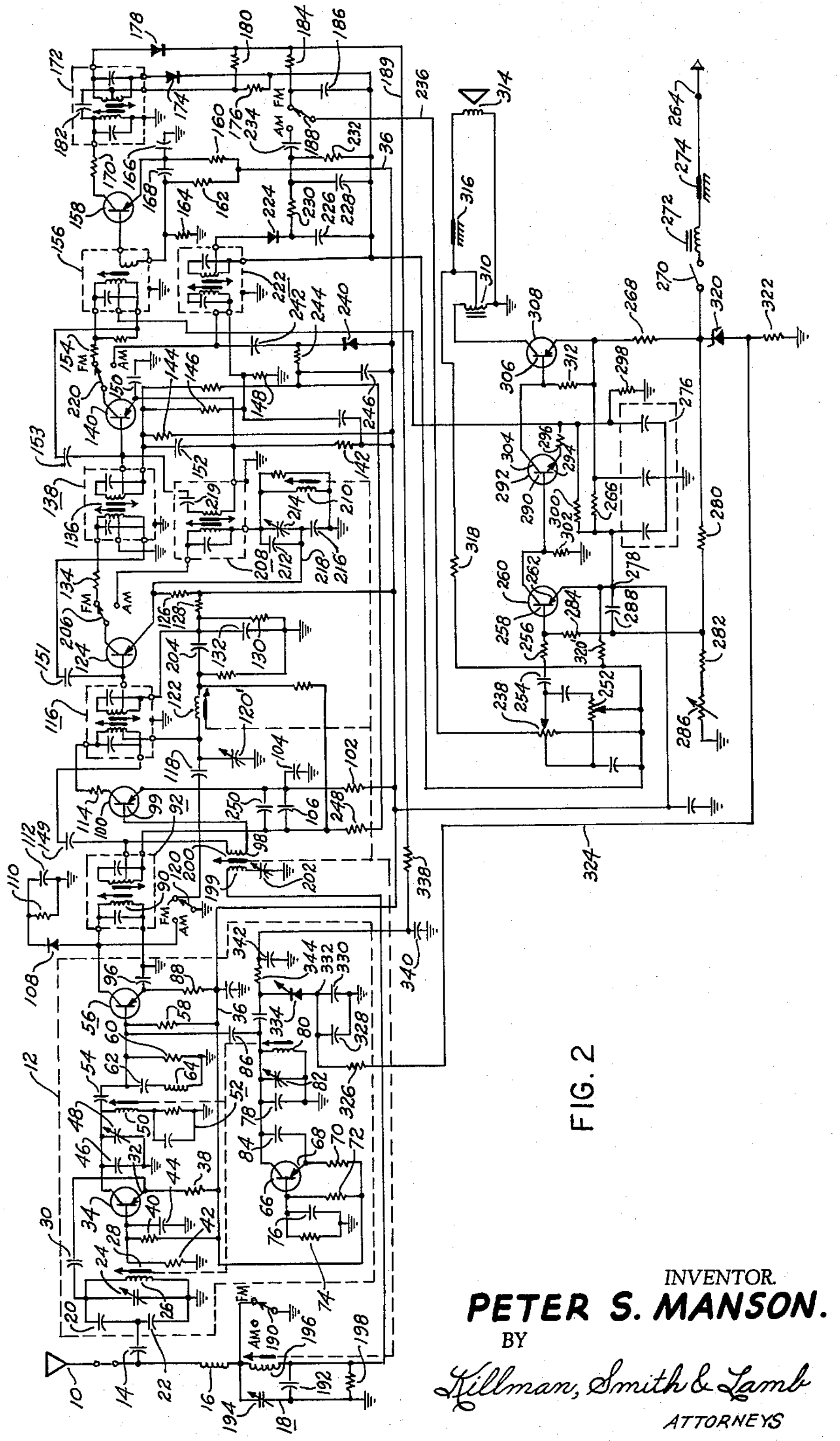

Other objects and advantages will become apparent from the following specification, taken in connection with the following drawings, in which:

FIG. 1 is a functional block diagram of an AM–FM receiver incorporating my invention; and FIG. 2 is a schematic diagram of the receiver of FIG. 1.

*The frequency modulation tuner*

Both AM and FM signals are received at the antenna shown in FIG. 2 at numeral 10. The FM signals are connected to the FM radio frequency (RF) stage shown in dotted outline at 12 through a coupling capacitor 14. Amplitude modulated signals are supplied through an inductor 16 to a tunable antenna circuit shown generally at numeral 18 which will be discussed below. The tunable antenna circuit of the FM radio frequency stage includes a pair of capacitors 20 and 22 constituting a capacitance tap and including a variable capacitor 24 connected as a trimmer across capacitors 20 and 22. This capacitance combination is connected in parallel with a variable inductor 26 including a tuning element 28 for varying the resonant frequency of this circuit. The output of this resonant circuit is coupled through a capacitor 30 to the emitter 32 of the FM radio frequency amplifier transistor 34. Direct current power is supplied to transistor 34 from a source of filtered direct current appearing on a line 36, which is connected to the emitter 32 through a resistor 38. The base of transistor 34 is connected to line 36 through a resistor 40 and also to ground through a resistor 42. It is the function of resistors 40 and 42 to establish the bias on the base of transistor 34 at a value less positive than that of the emitter 32 as is well known in the art. A bypass capacitor 44 connected in the base circuit of transistor 34 operates to bypass undesirable alternating current components in the power source to ground. The collector of transistor 34 is tuned by means of a resonant circuit consisting of a capacitor 46 and a trim capacitor 48 connected in parallel with a tunable inductance device 50. The tuned signal from the collector of transistor 34 is coupled through the coupling capacitor 54 to the base of transistor 56 which serves as the mixer in the FM RF section. The base of transistor 56 is biased in the usual manner by means of a resistor 58 which is connected to the filtered D.C. line 36 and a resistor 60 connected between the base and ground. A series resonant circuit consisting of a capacitor 62 and an inductor 64 is connected in parallel with resistor 60 and is tuned at the frequency modulation intermediate frequency (IF), thereby presenting a low impedance to signals at this frequency. This resonant circuit therefore contributes to more stable gain at the mixer stage.

The oscillator stage includes a transistor 66 having an emitter 68 connected to the filtered D.C. power line 36 through a bias resistor 70. The base of transistor 66 is biased in the conventional manner by means of a resistor 72 connected to the power line 36 and a resistor 74 connected between said base and ground. A small capacitor 76 connected in parallel with resistor 74 provides a conventional bypass function. The oscillator resonant circuit appears in the collector circuit of transistor 66 and includes a fixed capacitor 78 and a variable inductor 80 which is mechanically coupled with inductors 28 and 50 for tuning the radio frequency stage of the FM tuner. A trimmer capacitor 82 is also included in the resonant circuit. Feedback for the oscillator is provided by means of a capacitor 84 connected between the collector and emitter circuits of transistor 66. The oscillator signal which is, of course, the radio frequency signal displaced by the amount of the intermediate frequency signal, is coupled to the base of transistor 56 through a capacitor 86, where it beats together with the radio frequency signal appearing at this base. The emitter of transistor 56 is connected to the filtered D.C. power line 36 through a resistor 88. The signal appearing at the collector of transistor 56 is impressed across the primary winding 90 of the intermediate frequency transformer 92. A capacitor 96 in the emitter circuit of transistor 56 provides a means of bypassing undesirable alternating current components from the direct current power line to ground. The secondary winding of transformer 92 is connected through a transformer winding 98 to the base 99 of transistor 100. The emitter of transistor 100 is connected to the D.C. power line 36 through a biasing resistor 102 which acts in concert with a capacitor 104 as bypassing and decoupling means to prevent intermediate frequency signals from succeeding stages from feeding back into this first FM intermediate frequency stage. A capacitor 106 which is connected between the base and emitter circuit of transistor 100 has its value especially chosen to keep the impedance at the input to this transistor at a low value for the frequency modulation intermediate frequency signals encountered.

Connected in the collector circuit of transistor 56 is a filtering circuit consisting of a diode 108 and, in parallel, a resistor 110 and a capacitor 112 connected to ground. It is the function of this circuit to bypass large amplitude modulation pulses or "spikes" received at the antenna and which can cause phase modulation of the frequency modulation signal. The diode 108 has no effect on small signals, but operates to limit the amplitude of pulses in the collector of transistor 56 to a maximum value of the same order as the input signal. This circuit is not essential but will be found useful in some installations.

The amplified intermediate frequency modulated signal appearing at the collector of transistor 100 is connected through a resistor 114 to the primary winding of a second I.F. transformer 116. The primary winding of transformer 116 has a tap including a connection to a capacitor 118 which is connected through a switch 120 to ground and to a variable capacitor 120' also connected to ground. With the switch 120 in the FM position, as shown, the capacitors 118 and 120 provide a bypass circuit to ground from the primary winding of transformer 116, thereby preventing a substantial voltage drop, hence signal loss, across the inductor 122 which is part of the amplitude modulation tuner to be discussed below. The frequency modulation IF signals appearing on the secondary winding of transformer 116 are connected to the base of transistor 124 which serves as the second IF amplifier in the FM tuner. Connected between the emitter of transistor 124 and the direct current power line 36 is an emitter resistor 126 and connected between the direct current power line and the base of this transistor are base biasing resistors 128 and 130. A capacitor 132 connected between the secondary winding of transformer 116 and ground provides bypass function for FM operation and a radio frequency tap for AM operation. The amplified signal appearing on the collector of transistor 124 is connected through a resistor 134 to the primary winding 136 of an IF transformer 138. This signal then appears on the secondary winding of transformer 138 from whence it is supplied to the base of the third FM intermediate frequency amplifier transistor 140. Transistor 140 is connected to the D.C. power line through the conventional emitter resistor 142. Bias on the base of transistor 140 is effectively provided by means of a resistor 144 connected to the D.C. power line and additional resistors 146 and 148 connected between the base circuit and ground. The emitter of transistor 140 is bypassed to ground by means of a capacitor 150 and a capacitor 152 is connected between the emitter and base circuits to avoid any loss in gain occasioned by any unbypassed A.C. which might be developed across resistor 142. It will be observed that each of the three IF stages is neutralized by means of a feedback connection from the primary winding of the succeeding interstage transformers back through a capacitor to its base. Thus capacitors 149, 151 and 153 neutralize the first, second and third IF stages respectively.

The amplified signal appearing at the collector of transistor 140 is connected through a resistor 154 to an interstage transformer 156, which serves as means for coupling the signal to the base of the limiter transistor 158. The emitter of transistor 158 is connected to the D.C. power line through a biasing resistor 160 and base bias is provided by means of resistors 162 and 164, which are connected between the secondary winding of the interstage transformer 156 and the D.C. power line 36. The emitter is bypassed to ground by means of a capacitor 166 and an A.C. connection between the emitter and base is provided by capacitor 168 in order to prevent any loss in gain occurring from unbypassed alternating current signals appearing in the emitter circuit. The signal which has been subjected to the limiting action in transistor 158 now appears at the collector of this transistor and is connected through a resistor 170 to an interstage coupling transformer 172 from which it is supplied to the FM detector circuit. This circuit will be recognized as constituting a conventional discriminator circuit in which the secondary winding of transformer 172 is center-tapped and frequency variations on each side of the intermediate frequency appear across a first branch, including the lower half of a secondary winding transformer 172, a diode 174, and a resistor 176; and a second branch consisting of the top half of the secondary winding of transformer 172, a diode 178, a resistor 180, each branch returning to the center-tap of the transformer. Each half of the secondary winding of transformer 172 is effectively connected in series with the primary winding through a capacitor 182. Resistor 184 and capacitor 186 connected across the output of the discriminator constitute a circuit for de-emphasizing the high frequency signals which are normally pre-emphasized at the broadcast station in order to insure that these high frequencies are not lost in transmission. The output of the discriminator is then connected to the audio amplified through the function selector switch 188. The discriminator output is connected through a wire 189 to the AFC circuit which responds to any significant D.C. voltage output and alters the frequency output of the oscillator circuit in such as to return the discriminator voltage to center frequency. The operation of this circuit will be discussed in detail below.

*The amplitude modulation tuner*

Signals received at the antenna 10 will be directed to the FM radio frequency stage and also to the AM radio frequency stage, depending upon the position of the function selector switch 190. With the switch in the position shown, the input signal appears only across the input to the FM RF stage. When switch 190 is in the AM position, signals from the antenna are also fed to a tuned antenna circuit 18 including a resonant circuit containing a coupling capacitor 192, a variable capacitor 194, and an inductor 196 having a tunable iron core. The output of this circuit which is developed across a resistor 198 appears across the primary winding 199 of a transformer 200 and a variable capacitor 202. Transformer 200 contains a tunable core which is mechanically linked with the tunable element of inductor 196. This antenna circuit is thus a double tuned configuration. The secondary winding 98 of transformer 200 has induced therein the amplitude modulated radio frequency signal which is supplied to the base 99 of transistor 100. This transistor now becomes the radio frequency amplifier for the AM tuner. The FM signal which passes through the winding 98 during FM operation is by-passed to ground by switch 120 during AM operation. The amplified signals appearing at the collector of transistor 100 are connected through the transformer 116 to the manually tunable coil 122 and from there are connected through a coupling capacitor 204 through a portion of the secondary winding of transformer 116 to the base of transistor 124. Transistor 124 serves as a combined mixer-local oscillator for AM reception. The transformer 116 is designed for operation at the FM intermediate frequency and presents very low impedance to the AM signals. A switch 206 connected in the collector circuit of transistor 124 connects the output of this transistor to the AM intermediate frequency transformer 208 whose primary winding is also connected to an AM local oscillator resonant circuit including the tunable inductor 210 (which is mechanically linked with inductors 122, 200 and 196), the capacitor 212 and the trimmer capacitor 214. An additional capacitor 216 serves as a capacitive tap from which a portion of the output of the resonant circuit is connected back to the emitter circuit of the converter transistor 124 through a wire 218. The output of the IF transformer 208 is connected through a capacitor 219 to the base of transistor 140 which now becomes the first IF amplifier in the AM circuit. Connected in the collector circuit of transistor 140 is a switch 220 which, when switched to the AM position, supplies this output to the AM intermediate frequency transformer 222. The output from transformer 222 is directly coupled to a diode 224 which serves as the AM detector. The output from the detector is filtered by means of a filtering network consisting of capacitors 226 and 228 and resistors 230 and 232 and is coupled through a capacitor 234, the switch element 188 and line 236 to the volume control 238.

Connected between the input to transformer 222 and the filtered D.C. power line is a diode 240 which serves as the automatic gain control diode for the AM tuner. Also connected between the input to transformer 222 and the D.C. power line 36 is a blocking capacitor 242. The automatic gain control signal is filtered in a double section filter, the first section consisting of a resistor 244 and a capacitor 246 and the second section consisting of a resistor 248 and a capacitor 250, before being connected in the base circuit of the RF transistor 100.

*The audio amplifier and power supply*

The input circuit for the amplifier section is conventional including the volume control potentiometer 238 and a tone control potentiometer 252. The output from this network is coupled through a capacitor 254 and a resistor 256 to the base 258 of a first audio transistor 260. The emitter 262 is connected to the power source at terminal 264 through a resistor 266 and a resistor 268, a switch 270, a choke coil 272, and a spark plate capacitor 274. A three-section electrolytic capacitor 276 is connected in this circuit and in the emitter circuit of the succeeding transistor in order to provide the desired filtering action. Thus the power supplied to terminal 278 is filtered D.C. power which is supplied from this point to wire 36 and to the preceding stages. Resistor 268 is a self-heating type, such that anything which would tend to cause excessive currents to be drawn through this resistor would cause its temperature to increase, thus increasing its resistance and reducing current flow therethrough. A resistor 280, also effectively connected to the power terminal 264, acts in conjunction with resistors 282 and 284 to establish the bias on transistor 260. An adjustment of this value is provided by means of a variable resistor 286. The power supply current connected to resistor 280 is unfiltered. In order to remove noise or "purr" from the system, a capacitor 288 is connected between resistor 280 and the emitter 262. Capacitor 288 also prevents audio frequencies from subsequent stages from circulating in the base-emitter circuit of transistor 260.

The collector of transistor 260 is connected directly to the base 290 of an NPN transistor 292. The emitter 294 of this transistor is connnected to ground through a resistor 296 and a resistor 298, said latter resistor being effectively bypassed through one section of the electrolytic capacitor 276. A resistor 300 is effectively connected between the filtered power terminal 278 and the emitter 294 to provide the desired voltage level at said emitter. A bias resistor 302 is connected between base 290 and ground. The collector 304 of transistor 292 is coupled directly to the base 306 of the transistor 308, which is the output transistor of the amplifier. The collector of the output transistor 308 supplies the output of the amplifier to an inductive load consisting of a winding 310 connected between the collector and ground. The emitter of transistor 308 is connected directly to the special self-heating resistor 268. A resistor 312, which is typically a thermistor, operates to establish the bias on the base 306 and tends to stabilize the direct current flow in the system with temperature. A speaker 314 is connected across the output coil 310, its connections including a spark plate capacitive device 316. Overall series feedback is provided in the amplifier by means of a tap including a resistor 318, which is connected to the emitter 262 of the first audio transmitter 260.

It will be observed that the power supplied to terminal 264, except for the suppression of undesirable alternating components by choke 272 and capacitance device 274, appears across a diode 320, and a resistor 322. Diode 320 is a Zener diode and its function is to cause changes in the power line voltage to appear across resistor 322. This voltage, with the varying D.C. level, is carried through a wire 324 to a filtering bypass network consisting of a resistor 326 and a capacitor 328, and an additional capacitor 330 operating as an audio frequency filter to a terminal 332 on one side of a variable voltage capacitor 334. Connected to the opposite side of the variable voltage capacitor 334 is the automatic frequency control signal which is supplied from the discriminator through wire 189, a resistor 338, capacitors 340 and 342, and a resistor 344, said resistors and capacitors functioning as audio filtering means. Despite the filtering of the power supply to the oscillator transistor 66, some variations in the voltage across transistor 66 and variable capacitor 334 necessarily do occur from this source and this effectively alters the capacitance in the oscillator circuit and, hence, tends to cause a variation in the oscillator output frequency. These voltage variations are largely compensated for because the relatively unfiltered voltage appearing at the opposite terminal of variable voltage capacitor 334 causes the effective voltage drop across this capacitor to change in the opposite direction from the power supply change. The variable voltage capacitor 334 is also effectively connected in this oscillator and variations in the center frequency of the frequency modulated signal appear as changes in D.C. voltage at the upper end of the voltage variable capacitor 334, which result in changes in the effective capacitance of this capacitor and, hence, cause a change in the oscillator resonant frequency. The voltage change appearing at the upper end of the capacitor 334 is always of such polarity as to provide the desired correction in the frequency output of the oscillator circuit.

*Operation*

Operation of both the FM and AM tuning sections is basically conventional. With respect to the FM tuning section, signals received on the antenna 10 are tuned in the antenna tuned circuit before being supplied to the radio frequency stage. After being amplified in the radio frequency amplifier, and further tuned in the collector circuit, these signals are mixed with the output from the oscillator signal and supplied to the mixer stage. Considerable amplification is derived by amplifying the frequency modulated intermediate frequency signal through three IF stages including transistors 100, 124 and 140. With the switches in the position shown, it will be seen that each of the IF transistors is connected to its own specific interstage transformer which is designed for operation in the 10.7 megacycle frequency range. With the considerable amount of amplification supplied from the three IF stages, the limiter transistor 158 can be, and is, designed to effect complete elimination of amplitude modulaton components. In practical operation, it has been found that full limiting is effective on signals as low as ten microvolts at the antenna. Operation of the discriminator circuit and the audio amplifier sections are basically conventional, but it should be noted that the audio amplifier includes a feedback loop from output coil 310 through resistor 318 and resistor 320' to the emitter circuit of the first audio amplifier transistor 260, which constitutes series feedback rather than shunt feedback, as is more commonly employed. This is for the purpose of providing a high impedance at the input to the audio amplifier which matches the output impedance of the discriminator stage. Also, the particular automatic frequency control arrangement employed is unusual in the provision of the Zener diode controlled voltage across the variable voltage capacitor for sensing and compensating for changes in voltage level of the power source. The discriminator D.C. output level, which reflects changes or shifts in the center frequency of the carrier, is used to accomplish a change in capacitance which alters the effective oscillator frequency in proper direction to effect a correction. Power line voltage fluctuations which would tend to alter the oscillator output frequency are compensated for because the Zener diode 320 tends to transfer these fluctuations to the side of the voltage variable capacitor represented by terminal 332. Because of the action of the self-heating resistor 268 and other filtering means, these fluctuations are smaller on the voltage supplied to the top of the voltage variable capacitor 334, and the voltage drop across the voltage variable capacitor is actually in the opposite direction from the power line change.

Consideration should also be given to the specific switching arrangements employed which confer a number of advantages. With respect to the antenna circuits, it will be observed that both the AM and FM tuners effectively have their own individual tuned antenna circuits. With switch 190 in the AM position, the tuned circuit 18 is effective and additional tuning is accomplished by means of the tunable transformer 200 prior to impressing the AM signal on the base 99 of transistor 100. Thus the AM antenna circuit includes a double tuned antenna arrangement. Switch element 120, when in the FM position, operates to connect the primary winding of the FM interstage transformer 116 through capacitor 118 to ground and capacitor 120 to ground, thereby causing the greatest portion of the signal voltage drop to appear across the primary winding of the transformer 116. If this were not done, much of this voltage drop would appear across winding 122, thereby causing a substantial loss in gain. When in the AM position, switch 120 simply shorts the output of the FM mixer stage to ground and the AM output does appear across winding 122. Switch elements 206 and 220 each operate to connect the collectors of the transistors 124 and 140, respectively, to the proper interstage transformer. The frequency ranges for the AM and FM interstage transistors are, of course, greatly different and the impedance across the windings of these transformers is quite different. The customary arrangement in AM–FM radios is for the interstage transformer used on AM operation to be connected in series with those used for FM operaton during the AM mode. This is because the impedance of the windings of the FM transformer is inconsequential in the AM frequency range. Where it is desired to use a neutralizing feedback arrangement for each intermediate frequency stage, however, it has been found that this arrangement results in an appreciable degradation of the AM signal and therefore it has been found to be better practice to separate the AM and FM interstage transformers entirely. The switching connection of the FM and AM detector circuits through the switch member 188 is conventional.

Although only one embodiment has been shown and described herein, numerous modificaitons may be made within the scope of the present invention. The number of IF stages shown is that which provides very excellent performance and at some cost; however, where severe cost considerations prevail, the transistor limiter stage could be eliminated and its function taken over by the IF stage ahead, especially where a ratio detector is used. Alternatively, one could eliminate one IF stage in the FM tuner and the RF stage in the AM tuner. Similarly, the use of four tuning elements in the AM section provides maximum interference rejection, but where a lower level of such rejection is permissible, one such tuned element could be eliminated. The use of the "anti-click" circuit (including diode 108, etc.) is obviously a matter of the requirements of a given installation. Other modifications will occur to those skilled in the art.

I claim:

1. In a vehicular radio receiver capable of selectively receiving both amplitude and frequency modulated signals, an audio amplifier;

an antenna circuit;

a frequency modulation tuner including a tuned radio frequency amplifier, frequency conversion means including a resonant circuit, a plurality of intermediate frequency amplification stages, limiting means and detecting means, and an automatic frequency control circuit including a variable voltage capacitor connected in said resonant circuit and connections between said detector and one side of said variable voltage capacitor;

an amplitude modulation tuner including a radio frequency amplifier stage, a converter stage, an intermediate frequency amplifier stage, all of said stages sharing active elements with said frequency modulation intermediate frequency amplification stages, and a detector;

switching means for switching betwen said frequency modulation tuner and said amplitude modulation tuner including a plurality of mechanically interconnected switch elements including a first element which when in a first position causes the entire output of the antenna circuit to be supplied to the radio frequency amplifier of said frequency modulation tuner and when in a second position causes the output of said antenna circuit to be supplied to said amplitude modulation radio frequency stage, a second element which when in a first position causes the output of one of said frequency modulation intermediate frequency stages to be developed across the primary winding of the succeeding frequency modulation interstage transformer and when in a second position grounds the output of said frequency modulation tuner frequency conversion means, and a third element which when in one position connects said frequency modulaton detector to said audio amplifier and when in another position connects said amplitude modulation detector to said audio amplifier;

and power supply means for said receiver including filtering means and a Zener diode connecting substantially unfiltered power to the opposite side of said variable voltage capacitor such that voltage variations in the filtered power source which appear across said resonant circuit are reflected in voltage variations across the voltage variable capacitor in the opposite direction, thus providing compensation for such voltage variations which would otherwise tend to change the frequency of the output of said resonant circuit.

2. In a radio receiver capable of selectively receiving both amplitude and frequency modulated signals and including a sound transducer, amplification means for driving said sound transducer; and an antenna circuit;

a frequency modulation tuner including a tuned radio frequency amplifier with a first transistor, frequency conversion means including a second transistor, a plurality of intermediate frequency amplification stages, limiting and detecting means; and interstage transformer means connected between said intermediate frequency amplification stages and between said stages and said limiting means;

an amplitude modulation tuner including a converter stage and an intermediate frequency amplification stage including an interstage transformer, each of said amplitude modulation stages sharing an active element with one of said frequency modulation intermediate frequency amplification stages, and a detector;

and switching means for switching between said frequency modulation tuner and said amplitude modulation tuner comprising a plurality of mechanically interconnected switch elements including a first element which when in a first position causes the entire output of the antenna to be supplied to said frequency modulation radio frequency amplifier and when in a second position permits said signal to be supplied to said amplitude modulation tuner, a second element which when in a first position connects the active element of one of said frequency modulation intermediate frequency stages to one of said frequency modulation interstage transformer means and when in a second position connects said active element to said amplitude modulation interstage transformer, and a third element which when in one position connects said frequency modulation detector to said amplification means and when in a second position connects said amplitude modulation detector to said amplification means.

3. A radio receiver capable of selectively receiving both amplitude and frequency modulated signals and including a speaker, an audio amplifier for driving said speaker, and an antenna circuit;

a frequency modulation tuner including a tuned radio frequency amplifier, an oscillator circuit including a resonant circuit, a mixer stage connected to said radio frequency stage and said oscillator circuit; first, second, and third intermediate frequency amplification stages, a limiter stage, a detector stage, interstage transformers connected between said intermediate frequency stages and between said third intermediate frequency stage and said limiter stage, and an automatic frequency control system including a voltage variable capacitance device connected in said resonant circuit and biased from a controlled regulated voltage source, said device being connected to said detector circuit such that changes in the output direct current voltage level of said detector circuit effectively vary the voltage bias on said device, thereby varying the resonant frequency of said resonant circuit in such sense as to hold said oscillator output frequency substantially constant;

an amplitude modulated tuner including a converter stage and an intermediate frequency amplification stage, each sharing an active element with one of said frequency modulation intermediate frequency amplification stages, a detector stage, and interstage transformers connected between said converter stage and said intermediate frequency stage and between said intermediate frequency stage and said detector stage;

and switching means for switching between said frequency modulation tuner and said amplitude modulation tuner including a first switching element for switching the output of the active element serving as the amplitude modulation converter stage and the second frequency modulation intermediate frequency stage to either of the immediately following amplitude modulation or frequency modulation interstage transformers, a second switching element for switching the output of the active element serving as the amplitude modulation intermediate frequency stage and the frequency modulation third intermediate frequency stage to either of the immediately following amplitude modulation or frequency modulation interstage transformers, and a third switching element for switching either said amplitude modulation detector or said frequency modulation detector to said amplifier.

4. In a vehicular radio receiver capable of selectively receiving both amplitude and frequency modulated signals and including a sound transducer, amplification means for driving said sound transducer; and an antenna circuit;

a frequency modulation tuner including a tuned radio frequency amplifier with a first transistor, frequency conversion means including a second transistor, a plurality of intermediate frequency amplification stages, limiting and detecting means;

an amplitude modulation tuner including a radio frequency stage, a converter stage and an intermediate frequency amplification stage, each of which shares an active element with one of said frequency modulation intermediate frequency amplification stages, and a detector;

and switching means for switching between said frequency modulation tuner and said amplitude modulation tuner comprising a plurality of mechanically interconnected switch elements including a first element which when in a first position causes the entire output of the antenna circuit to be supplied to the radio frequency amplifier of said frequency modulation tuner and when in a second position causes the output of said antenna circuit to be supplied to said amplitude modulation radio frequency stage, a second element which when in a first position causes the output of one of said frequency modulation intermediate frequency stages to be developed across the primary winding of the succeeding frequency modulation interstage transformer and when in a second position grounds the output of said second transistor, and a third element which when in one position connects said frequency modulation detector to said amplification means and when in another position connects said amplitude modulation detector to said amplification means.

5. In a radio receiver capable of selectively receiving both amplitude and frequency modulated signals, an audio amplifier;

an antenna circuit;

a frequency modulation tuner including a tuned radio frequency amplifier, frequency conversion means including a resonant circuit, intermediate frequency amplification means including a transistor and a frequency modulation interstage transformer, and limiting and detecting means;

an amplitude modulation tuner including a tuned radio frequency stage, a converter stage, an intermediate frequency amplification stage including said transistor and an amplitude modulation interstage transformer, and a detector;

and switching means for switching between said frequency modulation tuner and said amplitude modulation tuner comprising a plurality of mechanically interconnected switch elements including a first element which when in a first position connects said transistor to said frequency modulation interstage transformer and when in a second position connects said transistor to said amplitude modulation interstage transformer, and a second element which, when in a first position, connects said frequency modulation detector to said audio amplifier and when in a second position connects said amplitude modulation detector to said audio amplifier.

6. A radio receiver as set forth in claim 5 wherein said switching means includes a third element which, when in a first position, causes the entire voltage output of the antenna circuit to appear at the input to the frequency modulation radio frequency amplifier and when in a second position, causes the output of said antenna circuit to be supplied to the amplitude modulation radio frequency stage;

and a fourth element which, when in a first position, causes the frequency modulation signal to be amplified in said intermediate frequency amplification means and when in a second position, grounds the output of the frequency modulation frequency conversion means and causes the amplitude modulation signal to be amplified.

7. A radio receiver as set forth in claim 5 wherein said frequency modulation tuner includes an automatic frequency control circuit comprising a voltage variable capacitor in said resonant circuit and connections from said frequency modulation detector circiut to one side of said voltage variable capacitor;

and power supply means are provided including filtering means and a Zener diode connecting relatively unfiltered power to the opposite side of said voltage variable capacitor such that voltage variations in the filtered power source which appear across said resonant circuit are reflected in voltage variations across the voltage variable capacitor in the opposite direction, thus providing compensation for such voltage variations which would otherwise tend to change the frequency of the output of the resonant circuit.

8. A radio receiver as set forth in claim 5 wherein said frequency modulation tuner includes variable inductance means at the input to said tuned radio frequency amplifier, at the output of said tuned radio frequency amplifier, and in said resonant circuit;

said amplitude modulation tuner includes variable inductance means in said antenna circuit, at the input to said radio frequency stage, at the output of said radio frequency stage and in said converter stage; and all of said variable inductance means are mechanically linked for tuning of both the amplitude modulation and frequency modulation tuners in synchronism.

9. A receiver for the reception of amplitude modulated (AM) or frequency modulated (FM) signals in the entertainment broadcast bands, comprising:

an antenna in which both AM and FM signals are induced;

tuning means coupled to said antenna for selecting an FM signal;

frequency converting means for converting the selected FM signal to an intermediate frequency higher than the frequency of AM signals;

tuning means coupled to said antenna for selecting an AM signal;

a plurality of amplifying elements;

a first group of circuits resonant at the intermediate frequency to which FM signals are converted;

a second group of circuits resonant at frequencies lower than said FM intermediate frequency, said second group of circuits including circuits having resonant frequencies within the frequency band of AM signals and circuits resonant at an intermediate frequency lower than the frequency band of AM signals;

an audio amplifier, and switching means including a plurality of ganged switch poles for selecting AM or FM operation and which in the FM position simultaneously (a) disables said AM antenna tuning means, (b) connects said amplifying elements with said first group of circuits to provide amplification and detection of said FM intermediate frequency signal, (c) applies said detected FM signal to said audio amplifier;

and which in the AM position simultaneously (a) disables said FM frequency converting means, (b) connects said amplifying elements with said second group of circuits to provide a superheterodyne type receiver for selecting, converting, amplifying and detecting an AM signal, and (c) applies said detected AM signal to said audio amplifier.

10. In a superheterodyne receiver for the reception of amplitude modulated (AM) or frequency modulated (FM) signals in the entertainment broadcast bands, including a single antenna for signals in both the AM and FM frequency bands, the arrangement permitting certain amplifying elements of the receiver to serve dual functions and preventing interaction of elements functioning in the AM band with those functioning in the FM band, comprising a converter coupled to said antenna for reducing FM signals to an intermediate frequency higher than the frequency of AM signals, a first amplifying element;

input and output coupling means for FM intermediate frequencies connected to said first amplifying element;

a second amplifying element;

input coupling means for FM intermediate frequencies connected to said second amplifying element and output coupling means for FM intermediate frequencies connectable to said second amplifying element;

an antenna tuning circuit for AM signals connected between said antenna and said input coupling means of the first amplifying element;

a circuit tunable to AM signals connected between said output coupling means of the first amplifying element and said input coupling means of the second amplifying element;

a circuit tunable to frequencies offset from the frequencies of AM signals by an amount equal to an AM intermediate frequency and supplying an input to the second amplifying element, a coupling circuit for AM intermediate frequencies connected to said last named tuned circuit; and switching means for selecting AM or FM operating, including a plurality of ganged switch poles which in the FM position simultaneously
(a) ground said AM antenna tuning circuit,
(b) bypass said AM tuned circuit connected to the input coupling means of the second amplifying element and
(c) connect said second amplifying element to said output coupling means for FM intermediate frequencies, whereby said first and second amplifying elements serve as FM intermediate frequency amplifiers, and in the AM position said switch poles simultaneously
(a) disable said FM converter,
(b) remove the ground from said AM antenna tuning circuit, and
(c) connect said second amplifying element to said AM intermediate frequency coupling circiut whereby said first and second amplifying elements serve as a converter for AM signals.

11. The apparatus of claim 10 including a limiter circuit for FM intermediate frequency signals;
a discriminator for detecting limited FM intermediate frequency signals;
a detector for AM intermediate frequency signals;
an audio amplifier, and
additional ganged poles on said switching means which in the FM position
(d) apply FM intermediate frequency signals to said limiter, and
(e) apply detected FM signals to said audio amplifier;

and which in the AM position
(d) apply AM intermediate frequency signals to said AM detector, and
(e) apply detected AM signals to said audio amplifier.

12. The apparatus of claim 10 wherein said switching means in the AM position disables said FM converter by
(d) removing the power therefrom, and
(e) grounding the output of said converter.

References Cited by the Examiner

UNITED STATES PATENTS

| | | | |
|---|---|---|---|
| 2,512,530 | 6/1950 | O'Brien et al. | 325—316 X |
| 2,541,818 | 2/1951 | Gruen | 325—317 |
| 2,561,087 | 7/1951 | Anderson | 325—315 |
| 2,936,428 | 5/1960 | Schweitzer. | |
| 3,065,424 | 11/1962 | Whisenhunt | 325—492 |
| 3,090,918 | 5/1963 | Arguimbau | 325—315 X |
| 3,113,275 | 12/1963 | Minter | 331—183 X |

ROBERT H. ROSE, *Primary Examiner.*

DAVID C. REDINBAUGH, *Examiner.*

R. F. ROTELLA, S. J. BOR, *Assistant Examiners.*